Figure 1:
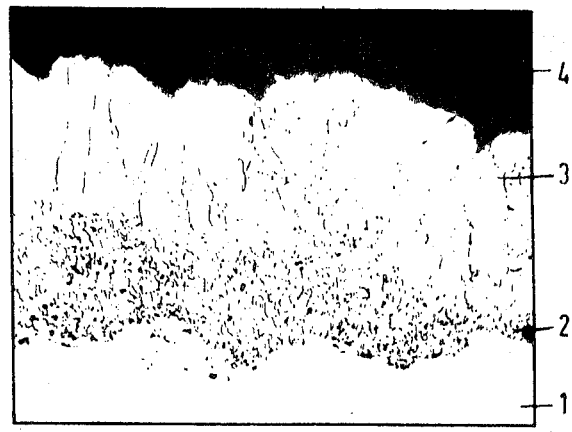

United States Patent

[11] 3,620,838

| [72] | Inventors | Martin Peehs;<br>Friedrich Wendler, both of Erlangen, Germany |
|---|---|---|
| [21] | Appl. No. | 882,398 |
| [22] | Filed | Dec. 16, 1969 |
| [45] | Patented | Nov. 16, 1971 |
| [73] | Assignee | Siemens Aktiengesellschaft<br>Erlangen, Germany |
| [32] | Priority | Oct. 9, 1965 |
| [33] | | Germany |
| [31] | | S 100010 |
| | | Continuation of application Ser. No. 584,882, Oct. 6, 1966, now abandoned. |

[54] METHOD OF DENSIFICATION OF POROUS LAYERS
1 Claim, 2 Drawing Figs.

[52] U.S. Cl............................................ 117/217,
29/198, 117/71, 117/107.2, 117/217 A, 117/220,
117/227, 313/346 R
[51] Int. Cl...................................................... B44d 1/18
[50] Field of Search............................................ 117/71,
107.2, 227, 217, 220, 93.1 PF, 217 A; 313/346;
29/198

[56] References Cited
UNITED STATES PATENTS

| 2,685,124 | 8/1954 | Toulmin, Jr. ................. | 117/107.2 X |
| 2,847,319 | 8/1958 | Marvin ......................... | 117/47 |
| 2,918,392 | 12/1959 | Beller ............................ | 117/227 X |
| 3,489,602 | 1/1970 | McKee ......................... | 117/227 X |
| 3,501,337 | 3/1970 | Webb ........................... | 117/107.2 |

*Primary Examiner*—Alfred L. Leavitt
*Assistant Examiner*—C. K. Weiffenbach

ABSTRACT: Described is a method of producing thermionic converters by densifying porous tungsten layers on the surface of a uranium dioxide/molybdenum substrate. The pores of the tungsten layer are filled by pyrolytically precipitating tungsten from the vapor phase from tungsten hexacarbonyl, $W(CO)_6$, at a substrate temperature of about 1,200° C., into the pores and onto the surface of the substrate. The CO gas developing during the densification process is withdrawn.

METHOD OF DENSIFICATION OF POROUS LAYERS

This application is a continuation of application Ser. No. 584,882 filed Oct. 6, 1966, now abandoned and relates to a method for densification of porous layers which adhere to or are applied to a metallic or ceramic base or substrate. Densification is necessary in both vacuum and discharge vessels techniques. These layers not only have density requirements but often also have specific requirements as to their diffusion blocking effect on the base material. The layers are applied by the plasma spray method, whose high temperatures permit the formation of a mechanically resistant layer on the base material. However, such layers still contain a certain amount of pores, which are undesirable for many purposes.

Known densification methods based on mechanical, thermal or chemical principles do not result in homogeneous and dense layers. The present invention has an object overcoming these deficiencies and achieves this object by filling the pores of said layers by a pyrolytic precipitation of material and preferably the same material from the gaseous phase of a volatile and pyrolytically splittable compound and their surfaces are beneficiated.

The method will be described in greater detail with reference to an example in the field of thermionic converters illustrated by FIGS. 1 and 2.

Figure 2:
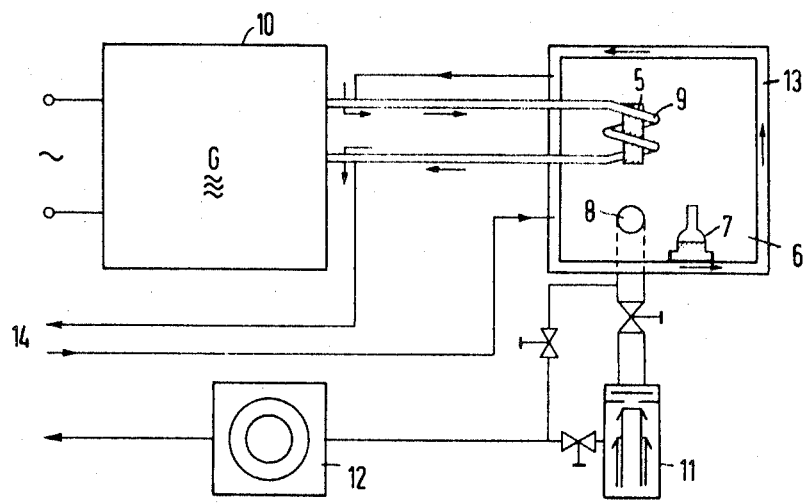

FIG. 1 is a polished section magnified 500 times of a porous layer which was densified according to the invention; and FIG. 2 illustrates the principle of an afterdensification device.

Thermionic converters, which are used in nuclear reactors, often contain fissionable material within the cathode. This fissionable material during the operation of the reactor provides for the heating of the cathode. It is very advantageous to combine the glow cathode and the current conductor in an $UO_2$— Mo cermet. The electron work function of molybdenum is notably increased by contamination of the surface, so that it becomes necessary to prevent or block diffusion of the uranium. To this end, it would be suitable to use tungsten which, based on its good cesium compatibility and its high work function, equals molybdenum as an emitter material. A thicker tungsten layer, for example, in the form of a shrink-fitted tube would not be favorable for neutron-physical reasons.

Coating the molybdenum base material, however, by tungsten in a galvanic manner or by vapor deposition to a desired thickness is not possible. Coating of the uranium-dioxide-molybdenum cermet in a tungsten melt meets with considerable difficulties. Only two methods produce a tungsten coating, namely metal spraying by means of a plasma burner and the pyrolytic precipitation of tungsten of easily volatile tungsten compounds, preferably tungsten carbonyl, $W(CO)_6$. The plasma spray method produces a porous layer which is not suitable as emitter and diffusion blockage. Only precipitation from the vapor phase produces a tungsten layer whose grain boundaries lie essentially perpendicular on the base material surface. The result is favorable for electron emission, but is unfavorable for the diffusion of the base material as the diffusion of the grain boundary takes place much faster than crystal diffusion.

We have found that the combination of both methods not only results in obtaining both effects, but above all it also produces a densification of the sprayed-on base material. The pyrolytic precipitation fills the fine pores of the sprayed-on tungsten layer with the finest tungsten crystallites, so that according to the polished section in FIG. 1, a fine crystalline layer 2 occurs, which shows no preference for the direction of the grain boundary. Grain boundary diffusion of the base material therefore meets with great difficulties. Further, the precipitation of tungsten from the vapor phase leads to a reinforcement of the sprayed-on tungsten layer, which consists of relatively large tungsten crystals, whose grain boundaries preferably run in the direction of the base material. Hence, this layer 3 has particularly favorable emission qualities. Furthermore, the uranium cannot penetrate from the base material 1, through the densified layer 2, into the emitter layer 3.

The after densification may be effected, for example, according to the schematic illustration of FIG. 2. A cup 7 with tungsten carbonyl $W(CO)_6$ is situated within vacuum vessel 6. The cathode portion 5 is located inside an induction coil 9, which is supplied with current by a high-frequency generator 10 for bringing the cathode 5 to a temperature of approximately 1,200° C. A preliminary or forepump 12 and diffusion pump 11 ensure that a vacuum of about $\sim 10^{-2}$ Torr results in vacuum vessel 6. This causes vaporization of the tungsten carbonyl. The hexacarbonyl is then pyrolytically dissociated on the surface of the cathode 5, heated to about 1,200° C.:

$$W(CO)_6 \rightarrow W + 6CO.$$

The resulting carbon monoxide gas is being pumped off and the free metal is deposited on the rough surface. The high temperature of the cathode further prevents conversion of the carbon monoxide into carbon and carbon dioxide and, hence, also prevents an undesirable deposit of carbide or carbon. To prevent condensation of the tungsten carbonyl at the walls of the vacuum vessel 6, as well as at the metalic turns of induction coil 9, the vacuum vessel has double walls 13 and heated with warm water of 50° to 60° C. The cooling water of induction coil 9 is at approximately the same temperature.

Of course, this coating apparatus may be changed in various aspects of its construction. It would also be possible to supply the tungsten carbonyl vapor from the outside.

Naturally, perfectly preprocessed workpiece surfaces are prerequisite for executing these methods in order that oxide formation can be prevented with a certainty. Under certain circumstances, a careful after densification of the sprayed surface may be effected by means of polishing.

This example shows a very important application of the method, according to the invention. Needless to say, there are also other favorable applications for this method, such as for a densified connection of workpieces which do not lend themselves to welding or soldering. Metal-ceramic connections may be produced analogously.

We claim:

1. The method of producing a thermionic converter containing fissionable material in the cathode which comprises plasma spraying a porous tungsten layer upon a uranium dioxide/molybdenum cermet, pyrolytically precipitating tungsten from gaseous tungsten hexacarbonyl, $W(CO)_6$, at a temperature of the porous substrate layer of about 1,200° C., into the pores of and on the surface of said porous layer, and withdrawing the CO gas developing thereby densifying the surface of said porous tungsten layer.

* * * * *